United States Patent
Braess

(10) Patent No.: US 9,111,452 B2
(45) Date of Patent: Aug. 18, 2015

(54) VEHICLE WITH AT LEAST ONE ENVIRONMENT DETECTION SYSTEM

(75) Inventor: Hans-Hermann Braess, Gruenwald (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 135 days.

(21) Appl. No.: 13/296,775

(22) Filed: Nov. 15, 2011

(65) Prior Publication Data

US 2012/0136536 A1     May 31, 2012

(30) Foreign Application Priority Data

Nov. 29, 2010 (DE) .......................... 10 2010 062 141

(51) Int. Cl.
G08G 1/16 (2006.01)

(52) U.S. Cl.
CPC ...................................... *G08G 1/166* (2013.01)

(58) Field of Classification Search
USPC ...................................................... 701/36, 1
See application file for complete search history.

(56) References Cited

U.S. PATENT DOCUMENTS

| | | | |
|---|---|---|---|
| 6,697,720 B2 * | 2/2004 | Ikeda ................................ | 701/36 |
| 6,788,964 B1 | 9/2004 | Satomura et al. | |
| 6,985,089 B2 * | 1/2006 | Liu et al. ........................ | 340/903 |
| 7,024,286 B2 * | 4/2006 | Kimura et al. ..................... | 701/1 |
| 7,471,192 B2 * | 12/2008 | Hara et al. ..................... | 340/435 |
| 7,532,107 B2 * | 5/2009 | Hara et al. ................. | 340/426.1 |
| 7,573,228 B2 * | 8/2009 | Karner et al. ................. | 320/104 |
| 7,817,848 B2 * | 10/2010 | Sakata et al. .................. | 382/159 |
| 7,983,802 B2 * | 7/2011 | Breed ............................... | 701/1 |
| 8,032,278 B2 * | 10/2011 | Flick ............................... | 701/36 |
| 8,229,663 B2 * | 7/2012 | Zeng et al. ..................... | 701/301 |
| 8,314,718 B2 * | 11/2012 | Muthaiah et al. ............. | 340/903 |
| 8,447,231 B2 * | 5/2013 | Bai et al. ..................... | 455/41.1 |
| 8,620,549 B2 * | 12/2013 | Nickolaou et al. ............. | 701/70 |
| 8,706,348 B2 * | 4/2014 | Beams et al. ................. | 701/32.7 |
| 8,718,917 B2 * | 5/2014 | Basnayake .................... | 701/300 |
| 2004/0188164 A1 * | 9/2004 | Maeno et al. ................. | 180/287 |
| 2007/0093943 A1 * | 4/2007 | Nelson et al. ..................... | 701/2 |
| 2007/0100507 A1 * | 5/2007 | Simon ............................. | 701/1 |
| 2008/0147253 A1 * | 6/2008 | Breed ............................... | 701/3 |

(Continued)

FOREIGN PATENT DOCUMENTS

| | | |
|---|---|---|
| DE | 100 20 799 A1 | 8/2001 |
| DE | 101 33 283 A1 | 1/2003 |

(Continued)

OTHER PUBLICATIONS

German Search Report dated Jul. 14, 2011 including English-language translation (Thirteen (13) pages).

*Primary Examiner* — Yonel Beaulieu
(74) *Attorney, Agent, or Firm* — Crowell & Moring LLP

(57) ABSTRACT

A vehicle is equipped with at least one environment detection system, a communication system which transmits information by remote transmission to receivers external to the vehicle, and at least one electronic control unit for both systems. The electronic control unit is designed to realize a standby mode which can be activated automatically or manually. The control device is configured such that when the vehicle is parked and the standby mode is activated, both the environment detection system and the communication system can be switched-on at least to a limited extent to predefined functions in regard to the transmission of information to receivers external to the vehicle.

16 Claims, 2 Drawing Sheets

(56) References Cited

U.S. PATENT DOCUMENTS

| | | | |
|---|---|---|---|
| 2008/0204556 A1* | 8/2008 | de Miranda et al. | 348/148 |
| 2009/0005936 A1* | 1/2009 | Browne et al. | 701/45 |
| 2009/0228172 A1* | 9/2009 | Markyvech et al. | 701/36 |
| 2010/0019932 A1* | 1/2010 | Goodwin | 340/902 |
| 2010/0217483 A1* | 8/2010 | Matsuno | 701/36 |
| 2011/0010094 A1* | 1/2011 | Simon | 701/301 |
| 2011/0098877 A1 | 4/2011 | Stählin et al. | |
| 2012/0004804 A1* | 1/2012 | Beams et al. | 701/32.7 |

FOREIGN PATENT DOCUMENTS

| | | |
|---|---|---|
| DE | 102 23 123 A1 | 12/2003 |
| DE | 102 47 683 A1 | 4/2004 |
| DE | 10 2004 037 733 A1 | 3/2006 |
| DE | 10 2006 059 257 A1 | 6/2008 |
| DE | 10 2008 061 304 A1 | 7/2009 |

* cited by examiner

VEHICLE WITH AT LEAST ONE ENVIRONMENT DETECTION SYSTEM

CROSS-REFERENCE TO RELATED APPLICATIONS

This application claims priority under 35 U.S.C. §119 from German Patent Application No. DE 10 2010 062 141.2, filed Nov. 29, 2010, the entire disclosures of which are herein expressly incorporated by reference.

BACKGROUND AND SUMMARY OF THE INVENTION

The invention relates to a vehicle with at least one environment detection system, a communication system which transmits information via remote transmission to receivers external to the vehicle, and at least one electronic control unit for both systems.

Vehicles with a variety of environment detection systems are already widely distributed. For example, systems of this type include those equipped with GPS sensors, with distance sensors of a variety of types, and/or with cameras in order to avoid collisions while driving. Among these, environment detection systems for driving functions such as distance-related speed control, lane-departure warning, lane change assistance, or parking aid can be used.

From DE 10 2006 059 257 A1, for example, a collision avoidance system is known, which system issues acoustic or optical warning information if, while in standby mode, an alien vehicle approaching the parked vehicle (ego vehicle) is detected by use of distance sensors.

Furthermore, various communication systems are known, such as, for example, so-called vehicle-to-vehicle communication systems, through which information can be transmitted remotely to receivers external to the vehicle.

It is an object of the invention to also use a vehicle (ego vehicle) of the above-mentioned type in the parked state to a greater extent for the use of other persons.

This and other objects are achieved according to the invention by providing a vehicle equipped with at least one environment detection system, a communication system which transmits information to receivers external to the vehicle (for example, vehicle-to-vehicle, or to a central traffic monitoring station) by remote transmission, and at least one electronic control unit for both systems. The electronic control unit is operatively configured through appropriate circuitry to provide a standby mode which can be activated automatically or manually. Furthermore, through appropriate programming and networking, the control device is designed such that when the vehicle is parked, and in given cases also abandoned, and the standby mode is activated, the environment detection system as well as the communication system can be switched on, at least to a limited extent, to perform predefined functions in regard to the transmission of information to receivers external to the vehicle.

Preferably, the environment detection system is first switched on in standby mode. On recognition of signals for executing predefined functions, the environment detection system switches the communication system on.

In one aspect of the invention the predefined functions are divided into different environment categories with defined reactions adapted by category. Possible environment categories can, for example, be related to the length of the standing time and/or the parking location of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
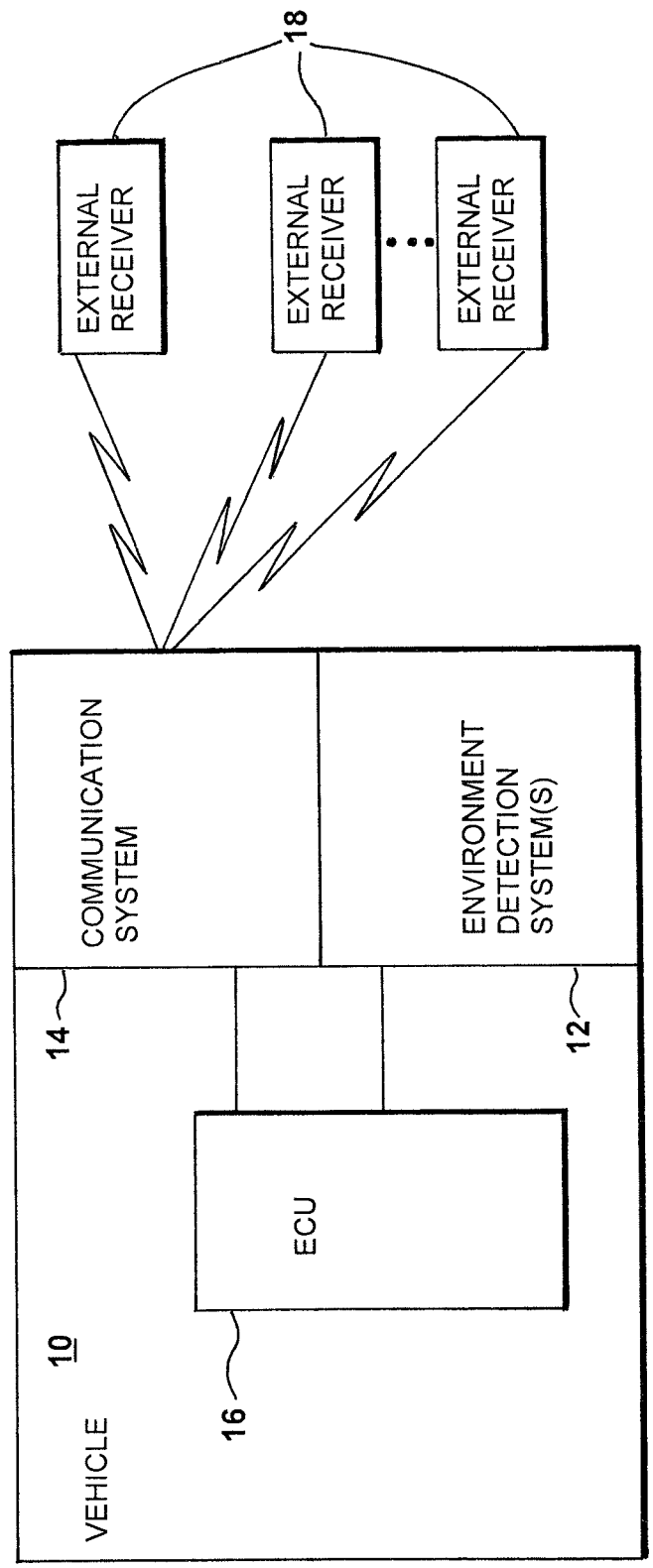
FIG. 1 is a generalized schematic block diagram illustrating a vehicle with at least one environment detection system according to an exemplary embodiment of the invention.

In FIG. 1, a vehicle 10 is equipped with at least one environment detection system 12, a communication system 14 and an electronic control unit 16. The environment detection system 12 can include, for example, GPS equipped systems, distance sensor systems, camera systems, etc. These systems are known for performing drive functions such as distance-related speed control, lane-departure warning, lane change assistance, parking aid assistance, etc. The communication system 14 is configured for transmitting information to external receivers 18. Such communications may, for example, be done wirelessly.

The electronic control unit 16 is operatively configured for controlling both the environment detection system 12 and the communication system 14. The electronic control unit 16 can be programmed or designed to provide a standby mode for the environment detection system 12 and communication system 14, which standby mode may be activated automatically or manually. When the vehicle 10 is parked and the standby mode is activated, the electronic control unit 16 is operable to switch-on the environment detection system 12 and communication system 14 at least to a limited extent to perform predefined functions in regard to the transmission of information to one or more external receivers 18.

Figure 2:
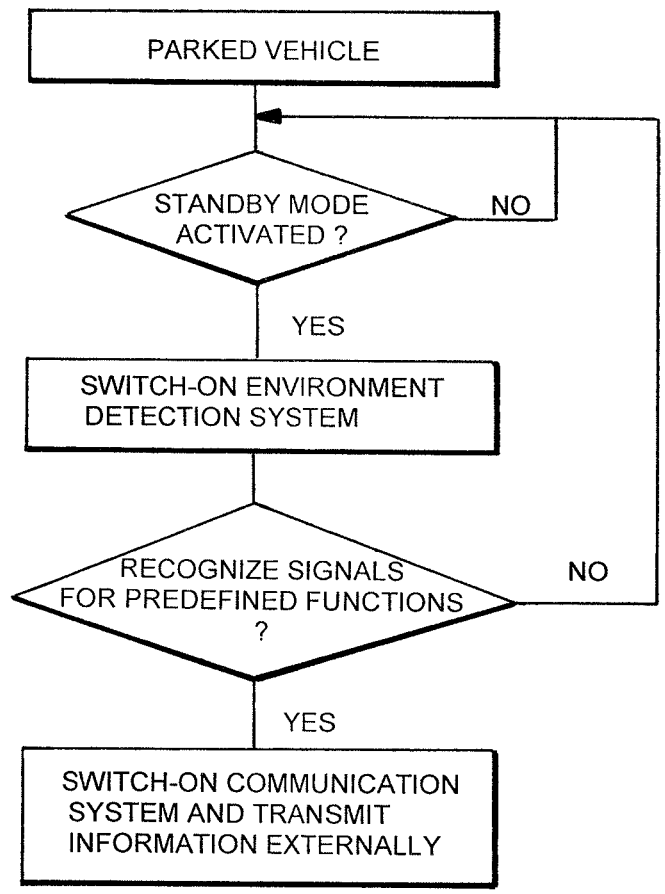
FIG. 2 is a generalized flow chart illustrating an exemplary method of operating a vehicle in accordance with the invention.

Referring to the exemplary flow chart in FIG. 2, beginning with a parked vehicle (20), the process determines whether the standby mode is activated (step 22). If not, then the process continues monitoring for the activation of the standby mode. When the vehicle is parked and the standby mode is activated, then the environment detection system may first be switched on (step 26). It is then determined whether signals for executing one or more of the predefined functions are recognized (step 28). If recognized, then the communication system is switched on in order to transmit information remotely to one or more external receivers (step 30).

In the following several advantageous embodiment examples of the invention are described.

Predefined functions in regard to the transmission of information to receivers external to the vehicle can, for example, be divided into the following categories, to which an increasing degree of criticality (Ki) can be assigned in the order represented here:

(1) Vehicle parked in a closed individual garage. (K1)
(2) Vehicle parked in a parking garage or parking space. (K2)
(3) Vehicle parked on the street in the city. (K3)
(4) Vehicle parked on a country road. (K4)
(5) Vehicle parked on a freeway. (K5)

The degree of criticality K1 to K5 increases with increasing numbering:

K1: collision with an approaching object (person or foreign vehicle) of any type very improbable—adapted reaction: none by the communication system.

K2: collision with an approaching object improbable or possible only with a very low probability—adapted reaction: for example, only vehicle-to-vehicle communication to the closest object if the closest object is a foreign vehicle.

K3: collision with an approaching object probable but only at a rather low speed—adapted reaction: for example, vehicle-to-vehicle communication in the immediate vicinity.

K4: collision with an approaching object dangerous due to elevated speed—adapted reaction: for example, vehicle-to-vehicle communication within a range of several kilometers to all foreign vehicles driving on the street in question.

K5: collision with an approaching object dangerous due to very high speed—adapted reaction: for example, vehicle-to-vehicle communication to objects within a range of several kilometers and transmission of corresponding information to a central traffic station and/or to the nearest police or security station.

In the following, in the case of parking the ego vehicle in the city with the basic degree of criticality K3, three examples for different predefined functions depending on different signals for executing the predefined functions (for example, enhanced adapted reactions) are described. The basic reaction in these three examples is vehicle-to-vehicle communication which, however, can be enhanced or modified if necessary.

EXAMPLE 1

Through distance sensor signals it is detected that foreign vehicles parking in front of or behind the ego vehicle are coming too close and getting out of the parked position will no longer be possible. A possible enhanced adapted reaction would be, for example, an incremental procedure: first, an acoustic or optical warning, then a vehicle-to-vehicle communication in the narrowest circle, and finally transmission of information to the nearest police station, depending on whether or not the foreign vehicle which is parking is moved away once again.

EXAMPLE 2

Through distance sensor signals or camera evaluation signals it is recognized that pedestrians in the immediate vicinity are moving in the direction of the roadway. A possible adapted reaction would be, for example, a vehicle-to-vehicle communication which informs the approaching foreign vehicles of a possible collision with the pedestrians. Thereby, for example, children playing ball can be kept safe.

EXAMPLE 3

The ego vehicle is parked in the vicinity of an intersection and detects, for example, by radar sensors or camera signals or by transmission signals of other vehicles, the foreign vehicles driving toward this intersection from all directions. On detecting an imminent danger of collision of foreign vehicles at the intersection, an adapted reaction here can also be the transmission of warning information via vehicle-to-vehicle communication.

The transmission of information has its own informational content for each example.

Additional examples, e.g., for special situations in case of darkness or bad weather, are contemplated.

If the ego vehicle, for example, has come to a standstill due to a breakdown or an accident—detectable by an error message from a control device—additional information can be transmitted along with this (for example, "vehicle breakdown or vehicle accident—in given cases still unprotected!"). In so doing, for example, the parking location can be taken into account, which in turn specifies the degree of criticality and thus predetermines the corresponding adapted and in given cases enhanced reaction (transmission of information).

Thereby the vehicle itself can, in the parked state, help to avoid collisions and to increase the safety of the general public.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle, comprising:
    at least one environment detection system;
    a communication system operatively configured to transmit information remotely to a plurality of receivers external to the vehicle;
    at least one electronic control unit operatively coupled with the environment detection system and the communication system, wherein:
        the electronic control unit is operatively configured to enable a standby mode activateable automatically or manually, the electronic control unit switching-on the environment detection system and the communication system when the vehicle is parked and the standby mode is activated, the switching-on being at least to carry out predefined functions related to transmitting information externally, wherein the predefined functions are divided into a plurality of different environment categories having defined reactions adapted to each of the plurality of different environment categories, wherein the plurality of receivers includes a plurality of other vehicles, and wherein each of the defined reactions comprises a transmission of the information to a corresponding subset of the plurality of vehicles, where each subset is defined according to a corresponding predetermined proximity range to the vehicle.

2. The vehicle according to claim 1, wherein the electronic control unit is operatively configured to first switch-on the environment detection system in the standby mode and, upon recognizing signals for executing the predefined functions, the environment detection system switches on the communication system.

3. A method of operating a vehicle having an environment detection system, a communication system for transmitting information to a plurality of receivers external to the vehicle, and an electronic control unit operatively coupled with the environment detection system and the communication system, the method comprising the acts of:
    detecting, by the electronic control unit, when the vehicle is parked;
    activating, by the electronic control unit, a standby mode for at least the environment detection system and communication system; and
    switching-on, by the electronic control unit, at least to carry out predefined functions relating to transmission of information to receivers outside of the vehicle both the environment detection system and the communication system when it is detected that the vehicle is parked and the standby mode is activated, wherein the predefined functions are divided into a plurality of different environment categories having defined reactions adapted to each of the different environment categories, wherein the plurality of receivers includes a plurality of other vehicles, and wherein each of the defined reactions comprises a transmission of the information to a corresponding subset of the plurality of vehicles, where each subset is defined according to a corresponding predetermined proximity range to the vehicle.

4. The method according to claim 3, wherein activation of the standby mode occurs one of automatically and manually.

5. The method according to claim 3, wherein the act of switching-on further comprises the acts of:
first switching-on, by the electronic control unit, the environment detection system when in the standby mode;
recognizing, by the electronic control unit, signals from the environment detection system for executing the predefined functions; and
second switching-on the communication system to transmit the information.

6. The method according to claim 5, wherein the second act of switching-on the communication system is carried out by the environment detection system switching-on the communication system.

7. The vehicle according to claim 1, wherein the plurality of different environment categories correspond to where the vehicle may be parked.

8. The vehicle according to claim 1, wherein the areas comprise at least one of a closed individual garage, a parking garage, a city street, a country road and a freeway.

9. The vehicle according to claim 1, wherein a degree of criticality is associated with each of the plurality of different environment categories.

10. The vehicle according to claim 9, wherein the degree of criticality for each of the plurality of different environment categories corresponds to at least one of a relative probability of the vehicle being involved in a collision and a likely severity of said collision.

11. The method according to claim 3, wherein the plurality of different environment categories correspond to where the vehicle may be parked.

12. The method according to claim 3, wherein the areas comprise at least one of a closed individual garage, a parking garage, a city street, a country road and a freeway.

13. The method according to claim 3, wherein a degree of criticality is associated with each of the plurality of different environment categories.

14. The method according to claim 13, wherein the degree of criticality for each of the plurality of different environment categories corresponds to at least one of a relative probability of the vehicle being involved in a collision and a likely severity of said collision.

15. The vehicle of claim 1, wherein each of the defined reactions corresponds to a degree of criticality, and wherein the information is to be transmitted to a subset of the plurality of vehicles having a predetermined proximity range that increases as the degree of criticality increases.

16. The method of claim 3, wherein each of the defined reactions corresponds to a degree of criticality, and wherein the information is to be transmitted to a subset of the plurality of vehicles having a predetermined proximity range that increases as the degree of criticality increases.

* * * * *